(12) United States Patent
Menegoli et al.

(10) Patent No.: US 8,779,731 B2
(45) Date of Patent: Jul. 15, 2014

(54) SYNTHETIC RIPPLE HYSTERETIC POWDER CONVERTER

(75) Inventors: Paolo Menegoli, San Jose, CA (US); Fabio Alessio Marino, San Jose, CA (US)

(73) Assignee: ETA Semiconductor Inc., San Jose, CA (US)

( * ) Notice: Subject to any disclaimer, the term of this patent is extended or adjusted under 35 U.S.C. 154(b) by 569 days.

(21) Appl. No.: 12/930,498

(22) Filed: Jan. 10, 2011

(65) Prior Publication Data

US 2012/0176822 A1 Jul. 12, 2012

(51) Int. Cl.
*H02M 3/156* (2006.01)

(52) U.S. Cl.
CPC .................................. *H02M 3/156* (2013.01)
USPC ............................ 323/222; 323/271; 323/282

(58) Field of Classification Search
USPC ......... 323/222, 223, 225, 268, 271, 272, 284, 323/288, 289; 363/21.12, 21.15, 21.18
See application file for complete search history.

(56) References Cited

U.S. PATENT DOCUMENTS

| | | | |
|---|---|---|---|
| 6,369,555 B2 | 4/2002 | Rincon-Mora | |
| 6,396,250 B1* | 5/2002 | Bridge | 323/283 |
| 7,626,370 B1 | 12/2009 | Mei et al. | |
| 8,085,011 B1* | 12/2011 | Petricek | 323/259 |
| 2003/0111989 A1* | 6/2003 | Kranz | 323/283 |
| 2005/0231177 A1* | 10/2005 | Tateno et al. | 323/225 |
| 2006/0001635 A1* | 1/2006 | Nakajima | 345/98 |
| 2006/0238029 A1* | 10/2006 | Hoon et al. | 307/39 |
| 2008/0042633 A1* | 2/2008 | Klein | 323/288 |
| 2008/0174286 A1* | 7/2008 | Chu et al. | 323/271 |
| 2008/0259652 A1* | 10/2008 | Huynh et al. | 363/21.12 |
| 2009/0273325 A1* | 11/2009 | Nakahashi et al. | 323/282 |
| 2010/0301827 A1* | 12/2010 | Chen et al. | 323/299 |
| 2011/0110124 A1* | 5/2011 | Basso et al. | 363/21.17 |
| 2011/0267018 A1* | 11/2011 | Tao | 323/282 |
| 2012/0161728 A1* | 6/2012 | Chen et al. | 323/271 |

* cited by examiner

*Primary Examiner* — Bao Q Vu
*Assistant Examiner* — Gustavo Rosario Benitez

(57) ABSTRACT

A novel switching hysteretic power converter is presented. The converter includes the generation of a synthetic ripple signal and a feedback network to combine a signal in phase with the inductor current with a signal proportional to the regulated output voltage. The presented approach provides a switching boost converter with a much simpler control method with respect to conventional inductive boost power converters. The hysteretic control provides stable operation in all conditions with excellent load and line transient response. Furthermore the hysteretic control allows high frequency switching, reducing the size and cost of the passive components. The presented converter includes the Discontinuous Conduction Mode of operation to achieve very high efficiency at light loads. The presented approach can also be applied to buck switching power converters with excellent performance in terms of transient response, stability, efficiency and operation at high switching frequencies. The approach can be extended also to the hysteretic control of isolated switching flyback converters.

15 Claims, 11 Drawing Sheets

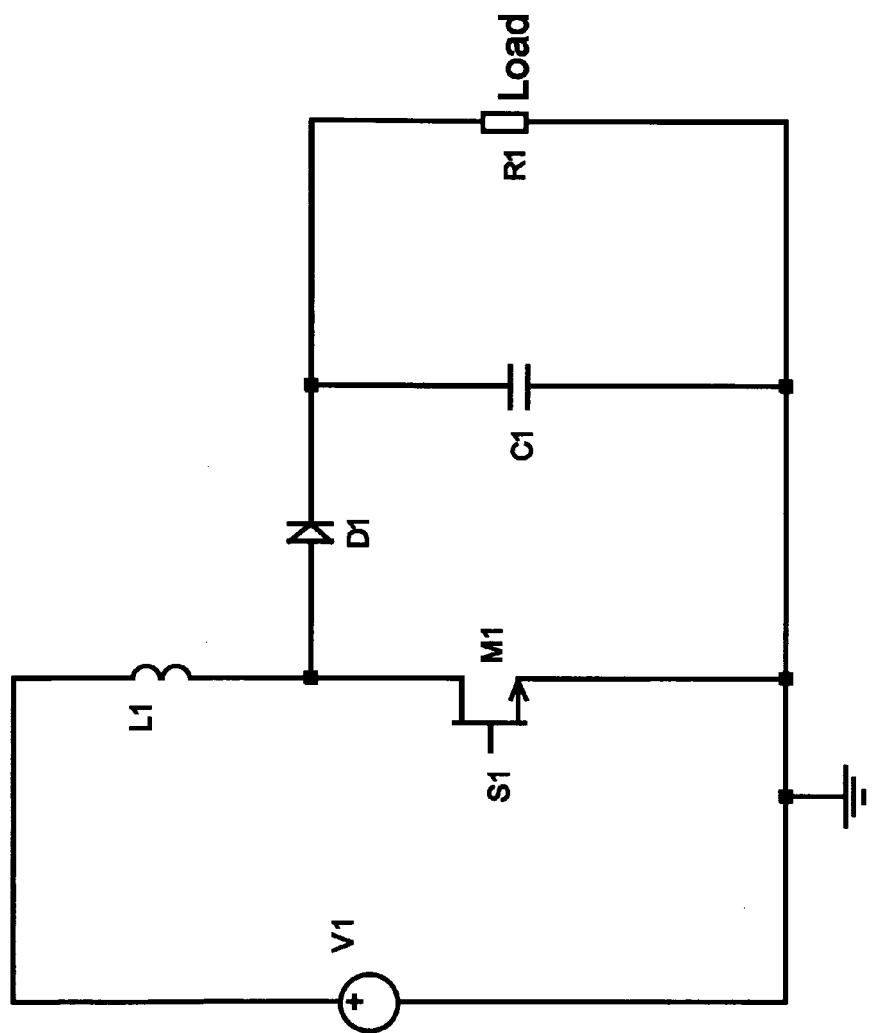

SYNTHETIC RIPPLE HYSTERETIC POWDER CONVERTER

BACKGROUND OF THE INVENTION

1. Field of the Invention

The present invention is in the field of power converters. The present invention is further in the field of semiconductor switching power converters. The present invention further relates to the field of integrated hysteretic control methods for switching power converters and circuits. The implementation is not limited to a specific technology, and applies to either the invention as an individual component or to inclusion of the present invention within larger systems which may be combined into larger integrated circuits.

2. Brief Description of Related Art

Modern electronic applications require power management devices that supply power to integrated circuits or more generally to complex loads. In general, power switching converters are becoming more and more important for their compact size, cost and efficiency. The switching power converters comprise isolated and non isolated topologies. The galvanic isolation is generally provided by the utilization of transformers. The subject invention refers to isolated and non isolated power converters.

Modern switching power converters are in general divided in step down power converters also commonly known as "buck converters" and step up power converters commonly known as "boost converters". This definition stems from the ability of the converter to generate regulated output voltages that are lower or higher than the input voltage regardless of the load applied.

Boost converters can be implemented by storing and releasing energy in a passive component and more precisely in a capacitor or in an inductor. In particular the case of capacitive charging is also known as charge pump converter while, when the inductor is used, the converter is generally known as inductive boost converter.

Inductive boost converters are very important to generate well regulated voltage rails at voltages higher than the input voltage available. Typically, this is obtained by first charging the inductor with energy by applying a current through it and thereafter switching off a terminal of the inductor so as to discharge the current into a load at higher voltage. The most known and used prior art for a switching non isolated inductive boost converter topology is shown in FIG. 1.

The modes of operation of inductive switching power converters are mainly two. The first is the Continuous Conduction Mode (CCM) characterized by the fact that, at steady state, the inductor current increases and decreases with the switching frequency and duty cycle but it is never kept at zero during the duty cycle. CCM generally occurs when the load current is high enough to require a positive inductor current and therefore a constant flow of energy from the input to the output. If and when the inductor current crosses a zero value the converter can be kept in CCM by allowing the inductor current to become negative and therefore discharging the output capacitor.

The second mode of operation is the Discontinuous Conduction Mode (DCM) characterized by the fact that when the inductor current reaches zero value, it is kept at zero for part of the period. This second mode is generally entered to when the load current is small. If the load current is not very large the output capacitor can provide enough energy to the load for part of the switching period so that during that time interval the inductor energy can be null. Typically, in DCM the output voltage ripple is more pronounced since the energy is stored also in the output capacitor so as to allow lower switching frequency.

Fast control of boost converters is difficult to obtain in CCM because there is always an intrinsic delay in providing energy to the load since the inductor has to be first charged with current flowing in it. If the load suddenly changes from a low current to a high current load, the boost converter circuit has to spend some time to charge the inductor first and during this time no current/energy is supplied to the load. This phenomenon is not present in buck converters where by applying current to the inductor, the same current is flowing in the load as well.

The small signal analysis of the boost circuit in CCM points out to the presence of a right half plane zero (RHPZ). This is the effect that an increase of load current causes an apparently counter-intuitive decrease of the current in the diode due to an increase of duty cycle. This RHPZ can complicate the stability of the loop and generally is dealt with by rolling off the loop gain of the switching voltage regulator at relatively low frequency, making the overall response of the boost converter quite slow.

Generally the boost converters are controlled with PID (proportional-integral-derivative) type of control method. In particular current mode controls are quite common because they include two nested loops: one for the control of the output voltage and one for the control of the output current. However, as mentioned, these types of control methods do not present high bandwidth and require the adoption of large output capacitors to obtain acceptable load transient responses.

High frequency switching power converters are increasingly more popular due to the advantage of using low value inductors and capacitors reducing significantly the cost and board space of the power management section. Buck converters can successfully be operated at high frequency by using hysteretic and pseudo-hysteretic approaches. Generally the control loop of pseudo-hysteretic converters is relatively simple and the output voltage is summed to a ramp signal to generate a synthetic ripple. A prior art example of pseudo hysteretic switching buck converter is provided in Rincon-Mora (U.S. Pat. No. 6,369,555).

Generally this synthetic ripple signal is fed to a fast comparator that determines the charge and discharge timing of the inductor. For buck converters the implementation of a pseudo hysteretic control is relatively simple because the output stage of the buck, along with the inductor and the output capacitor, forms the integrating section of the converter that can be seen as a delta sigma converter. As mentioned, the buck converter charges the inductor while supplying current to the load.

The intrinsic delay of the boost architecture, deriving from the fact that the boost does not supply current to the load while charging the inductor, makes the implementation of an hysteretic approach much more difficult to obtain. However there are prior art attempts to achieve a hysteretic control of boost converter like what has been proposed by Mei et al (U.S. Pat. No. 7,626,370). In this case a ripple signal is generated by adding a resistor in series to the power switch device and the output filter capacitor of the boost power converter. However the proposed architecture presents two major drawbacks: a higher power dissipation because the resistor is placed directly on the power path, and a high output ripple because the resistor is in series to the output capacitor.

It is therefore a purpose of the present invention to describe a novel structure of a switching boost converter with synthetic ripple generation that can operate at high switching frequency with pseudo-hysteretic control and synthetic ripple generation, operating with high efficiency both in CCM and DCM depending on the load conditions.

SUMMARY OF THE INVENTION

It is an objective of the present invention to provide an inductive boost switching power converter that can operate at high switching frequency therefore allowing a reduction of the value, size, and cost of its passive components.

It is another objective of the present invention to provide a switching boost power converter that includes an hysteretic or pseudo-hysteretic control circuit by means of a feedback network that generates a signal containing the information of instantaneous output voltage, both from a dc standpoint and from an ac standpoint, and a means of generating a synthetic ripple signal that is proportional and in phase with the inductor current allowing very fast load transient response.

It is another objective of the present invention to provide a switching boost converter with high efficiency at any load condition by means of control of CCM (Continuous Conduction Mode) mode of operation and DCM (Discontinuous Conduction Mode) mode of operation depending on the load impedance values.

The present invention describes an inductive switching boost converter that combines the information of the output voltage to the information of inductor current during the charging phase, thus generating a synthetic ripple signal that can be compared to a reference voltage and provide the base for a hysteretic control of the boost converter. The circuit proposed is relatively simple even though the detailed characteristics of the power converter such as its efficiency at different load conditions, the output voltage ripple in different load conditions, and the response to the load and line transient depend on the overall implementation and on the value of the output capacitor, output inductor, input voltage, output voltage and switching frequency.

It is important to note that the synthetic ripple signal, although related to the output voltage ripple present at the output terminal of the power converter, is separate and distinct from it. The synthetic ripple signal is used to determine the control mechanism of the switching regulator and it may therefore have characteristics dependent on the conditions of the power converter operations.

The present invention, in its preferred embodiment, shown in FIG. 2, describes a transistor M3, in parallel to the main power switch M2, with a resistor R3 in series to its source. The relative size of M3 is only a fraction of the power switch M2. The gate of M3 is in common with M2 so that the two devices are turned on and off in synchronism. M3 operates as a switch in the triode region that transfers to its source the voltage appearing at its drain when it is on. That voltage across the resistor R3 represents a signal that is proportional and in phase with the current in the inductor L2 during the charging phase.

The signal across the resistor R3 depends on the on resistance of the power transistor M2, while during the recirculation phase (when M2 is off) it falls with a time constant that is proportional to the value of R2 and the total capacitance present in the feedback network 3 as seen at the node 5. This signal is therefore in phase with the inductor current. This signal is added in the feedback network 3 to a signal proportional to the voltage of the output node 4. The resulting signal 6 is fed to the fast comparator 1 which compares it with a reference signal 7 for proper output voltage regulation. The output of the comparator feeds a control logic and pre-driver block 2 to determine the adequate duty cycle and provide the drive signal to M2.

Since the signal across the resistor R3 is proportional to the inductor current, it can be utilized to implement an overcurrent protection simply by means of comparing the voltage across R3 with a reference voltage that relates to the maximum inductor current allowable. Furthermore since, as mentioned above, during the recirculation phase, the voltage across R3 discharges with a time constant dependent on the resistor value and the total capacitance seen at the input 5 of the feedback network 3, the value of the resistor R3 affects directly the converter switching frequency.

This correlation can be utilized to form a frequency control circuit where the resistor R3 is replaced by a MOS transistor whose on-resistance is modulated to maintain the switching frequency of the converter constant independently from the conditions of the power converter (input voltage, output load). This is described in FIG. 5. However the value of the resistor R3 is also related to the overall gain of the control circuit of the boost converter, therefore particular attention has to be paid to the interaction of the two control loops.

As can be seen, the proposed architecture is very simple and it does not add voltage ripple to the converter output while maximizing its efficiency. The feedback network 3 can be implemented in various ways, with passive components or with a combination of passive and active components. One of its embodiments is shown in FIG. 3. In this implementation the feedback network comprises exclusively passive components. The resistor R4 and R5 form a resistor divider to scale the output voltage down to the desired value. The capacitor C3, generally of larger value with respect to C4 and C5, provides a signal proportional to the current in the output capacitor C2 of FIG. 2 and directly affects the switching frequency. This is particularly important in the presence of fast load transients. Furthermore in a different embodiment, the resistor R3 of FIG. 2 can be included in the feedback network.

In presence of a fast load transient, the abrupt change of current in the load causes an equivalent and opposite change of current in the output capacitor C2 of FIG. 2. If a second capacitor were added in parallel to C2, the change of current would be split according to the values of the two capacitors. If C3 of FIG. 3 is large enough with respect to C2, and if the resistor R3 of FIG. 2 is not too large, a portion of the current flowing in C2 tends to flow in C3. This forms a fast signal at the level of the feedback network that takes into account the change due to the load transient.

The capacitor C5 couples in AC the signal from the node 5, proportional to the inductor current, to the signal of the resistor divider R4/R5, which is proportional to the output voltage effectively summing the two signals. Finally the capacitor C4 is a feed-forward capacitance to provide high phase margin and stability in all operating conditions. The signal at the node 6 represents the synthetic ripple signal that is used by the comparator to generate the hysteretic control. This signal also governs the output stage switching frequency and contributes to a fast load and line transient response.

The topology and values of the components in the feedback network define the self oscillating switching frequency, the stability, and the load and line transient response performance of the whole converter. The switching frequency has a direct impact on the output voltage ripple and on the converter efficiency. The switching frequency can be regulated and imposed by a separate frequency control loop that can be implemented in various ways. When the switching frequency is regulated, for example by means of a PLL (Phase Lock Loop), the study of the loop becomes more complex and an accurate analysis can be performed by periodic state analysis to guarantee the circuit stability in all conditions.

Although, as mentioned above, the switching frequency could be obtained by modulating the value of the resistance R3 of FIG. 2, the methods and means for regulating the switching frequency are beyond the scope of the present invention and do not affect its novelty. The several methods and techniques to regulate the switching frequency are well known to anyone skilled in the art.

The feedback network 3 is typically composed of passive components but, more in general, it could include active components and have different functionalities, depending on the load and line conditions and on whether the converter is in CCM or DCM mode of operation. Furthermore the feedback network, differently from the embodiment of FIG. 3, may not include a resistor divider to scale down the output voltage to a desired voltage since that may be external to the feedback network block.

The circuit of FIG. 4 is another example of how the feedback network could be implemented. The solution of FIG. 4 is very similar to the circuit of FIG. 3 with the only difference being the addition of the capacitor C6 coupled to the resistor divider and to ground. This extra capacitor introduces a further degree of freedom to obtain the optimum switching frequency (output voltage ripple) and line and load transient response of the power converter, maintaining a very fast control loop amenable to high switching frequencies.

The diode D2 of FIG. 2 could be also replaced by a switch in order to achieve higher efficiency, while maintaining valid all the general considerations made so far. The proposed circuit topology is amenable to operate at high switching frequency because the loop does not include complex stability networks that introduce poles in the frequency domain and therefore delays in the operation of the circuit. The two most critical blocks in the loop are the fast comparator and the feedback network. The switching frequencies for the proposed topology can be in the order of many tens of MHz allowing much smaller inductor and capacitors values.

In the case of very high switching frequencies it may be advantageous to use a Schottky diode or more generally a diode, as in FIG. 2, rather than a MOS power device to optimize conversion efficiency. However, that the best implementation largely dependent on the operating currents and on the process technology available for the application.

When the load current is low enough, and dependently on the output and input voltage ratio, the inductor current may reach the zero value. If the control loop operates in CCM the inductor current becomes negative impacting adversely the converter's efficiency. However if a diode is used, as shown in FIG. 2, the current in the inductor cannot be reversed and the power converter automatically operates in DCM when the load currents are low enough. If a switch is used in place of D2, then it is advantageous to monitor the inductor current by means of sensing the voltage drop across the switch itself, turning off the switch when the inductor current reaches zero and resuming the switching when the ramp signal at the output of the feedback network toggles the fast comparator.

The inductor charging phase can then be kept active for a predetermined amount of time seeking the optimum trade-off between the switching frequency and the output voltage ripple with the purpose of maximizing the overall converter efficiency. This mode is the DCM mode of operation and it is characterized by a lower switching frequency. The lower the switching frequency, the higher the output voltage ripple for a given inductor and output capacitor value. At light loads it may be desirable to allow higher output voltage ripple in order to obtain higher efficiency. The DCM mode can also be properly adjusted by adequate choice of values for the components in the feedback network, since automatically, lighter loads command longer time for the output voltage to drop and for the synthetic ripple signal to toggle.

Another important consideration is that the adoption of a power switch in place of the diode D2, although more cumbersome to drive at high switching frequencies, may provide the initial surge current control at start up which is very important for battery supplied power converters. This feature cannot be obtained by using the diode D2 as shown in FIG. 2.

Furthermore the initial phase of operation of the boost converter has to be set by means of open loop forced switching (for example by means of controlling the maximum on time of the switch or by means of maximum inductor current peak control) or by the implementation of a separate loop distinct from the proposed hysteretic loop. This is desirable until the output voltage has reached the regulation value, after which the hysteretic control loop can be phased in. This different mode of operation when the output voltage is not close to the desired final value is inherent in the nature of the hysteretic control loop for a boost converter. Possibly this could be implemented by using a more complex multi-mode feedback network that allows soft start and adaptive operation. However this is beyond the scope of the present invention.

It should also be noted that the input voltage V2 of FIG. 2 could be different from the power supply of the internal blocks of the integrated converter. In fact, the internal circuitry may be operated at lower supply voltages and implemented in a smaller lithography process technology and switched at high frequency with high efficiency.

The described invention can be applied also to SEPIC switching power converter circuit topologies or to isolated flyback switching power converters which include transformers to provide galvanic isolation between the power source and the regulated output voltage. In fact these topologies of power converter are characterized by the fact that the phase of providing energy to the output does not coincide with the phase of charging the inductor or the transformer, similarly to what occurs for the general boost power converter.

For the specific case of the flyback power converter, as long as the signal proportional to the output voltage at the secondary side is passed to the primary side and to the feedback network by means of a galvanic isolated method, like an opto-coupler or a signal transformer, the present invention can still be applied and a synthetic ripple signal be generated to control the converter with an hysteretic approach. This would allow high switching frequencies and reduce drastically the size of the transformer in addition to the output filter capacitor.

The described approach of generating a synthetic ripple signal by effectively summing a signal proportional and in phase with the inductor current during the charge phase with a signal proportional to the regulated output voltage can also be applied to a buck switching converter. In a step down non isolated switching converter the inductor current during the inductor charge phase is provided by a high side driver power switch, therefore the inductor current can be derived by sensing the drain voltage of the high side switch when it is on. This signal is naturally referred to the buck supply voltage positive terminal (input voltage), therefore an efficient and wide bandwidth transconductance amplifier can be utilized to transfer that signal to a resistor referred to the negative terminal of the input power source.

The output current of the OTA (Operational Transconductance Amplifier) is converted back into a voltage by the resistor referred to ground. This signal is fed to the feedback network in an analogous way described for the boost topology. The same type of feedback network can be utilized for the buck converter, making this solution very attractive for buck-boost converters as well, since the control method and circuit is practically the same. Again, this provides very good control of the output voltage independent from the load and line variations. This is also amenable to high switching frequencies and it offers excellent transient load and line response.

Similarly to the case of the boost circuit described above, the signal proportional to the inductor current can also be utilized as current limit sense. Additionally, the same feedback network, if appropriately sized in the values of its components, can be utilized in the case of DCM mode of operation when the load falls below a certain value.

As is clear to those skilled in the art, this basic system can be implemented in many specific ways, and the above descriptions are not meant to designate a specific implementation.

BRIEF DESCRIPTIONS OF THE DRAWINGS

The features, objects, and advantages of the present invention will become apparent upon consideration of the following detailed description of the invention when read in conjunction with the drawings in which:

FIG. 1 shows a general inductive boost switching power converter core circuit topology (prior art).

DETAILED DESCRIPTION OF SPECIFIC EMBODIMENTS

A FIG. 2

Figure 2A:
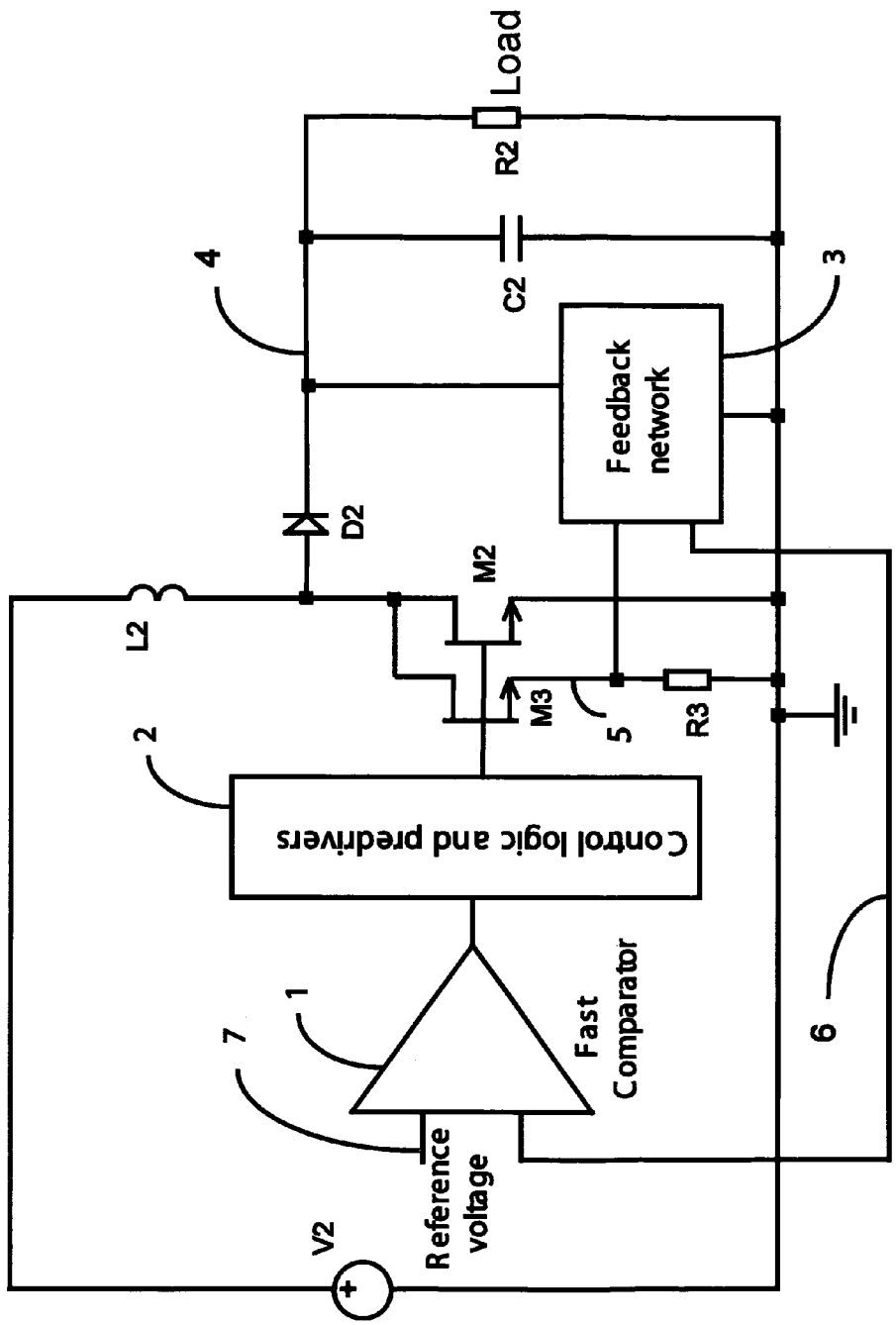
FIG. 2A shows a schematic of the synthetic ripple hysteretic boost power converter according to the preferred embodiment of the present invention.
Figure 2B:
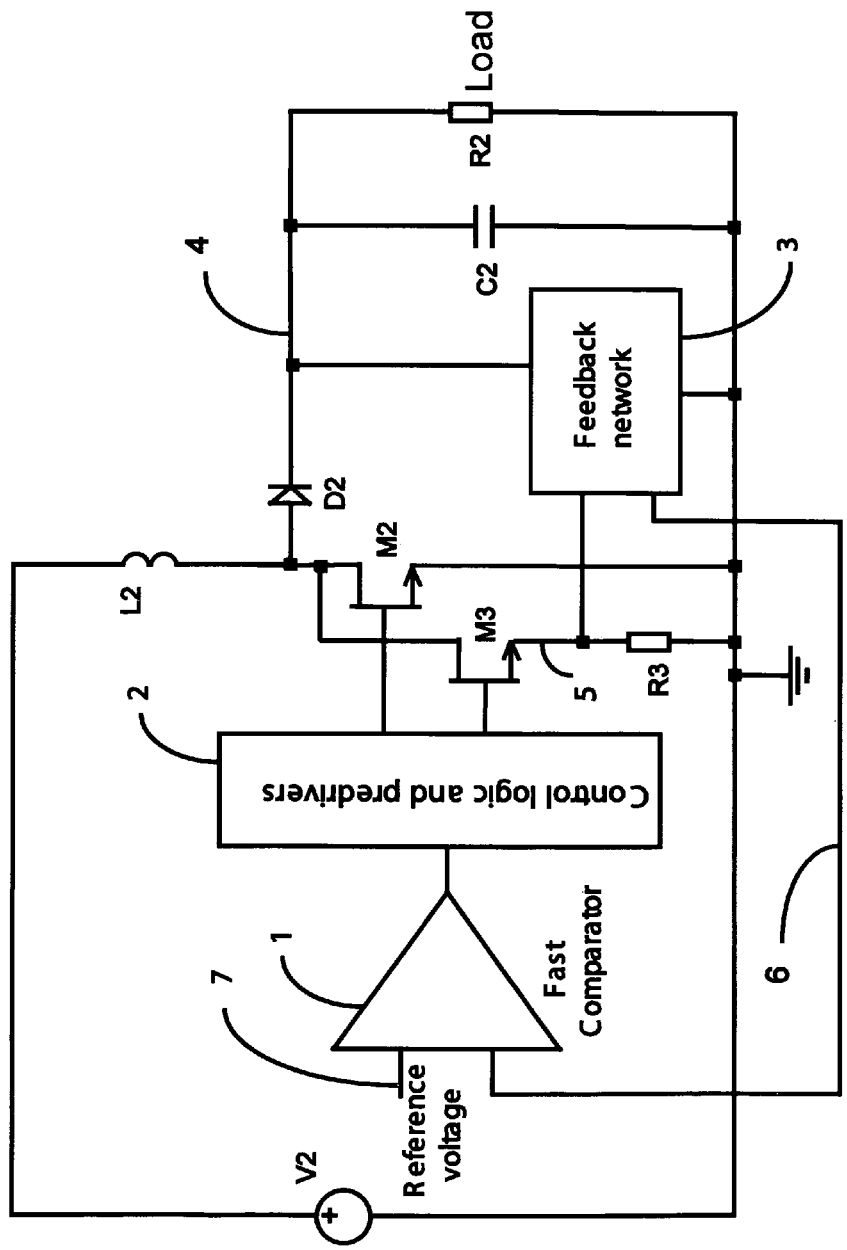
FIG. 2B shows a schematic of the synthetic ripple hysteretic boost power converter according to a further preferred embodiment of the present invention where the sense MOS transistor is driven with slight turn on delay with respect to the turn on of the power device and where the power device is turned off with slight turn off delay with respect to the sense MOS transistor.
Figure 2C:
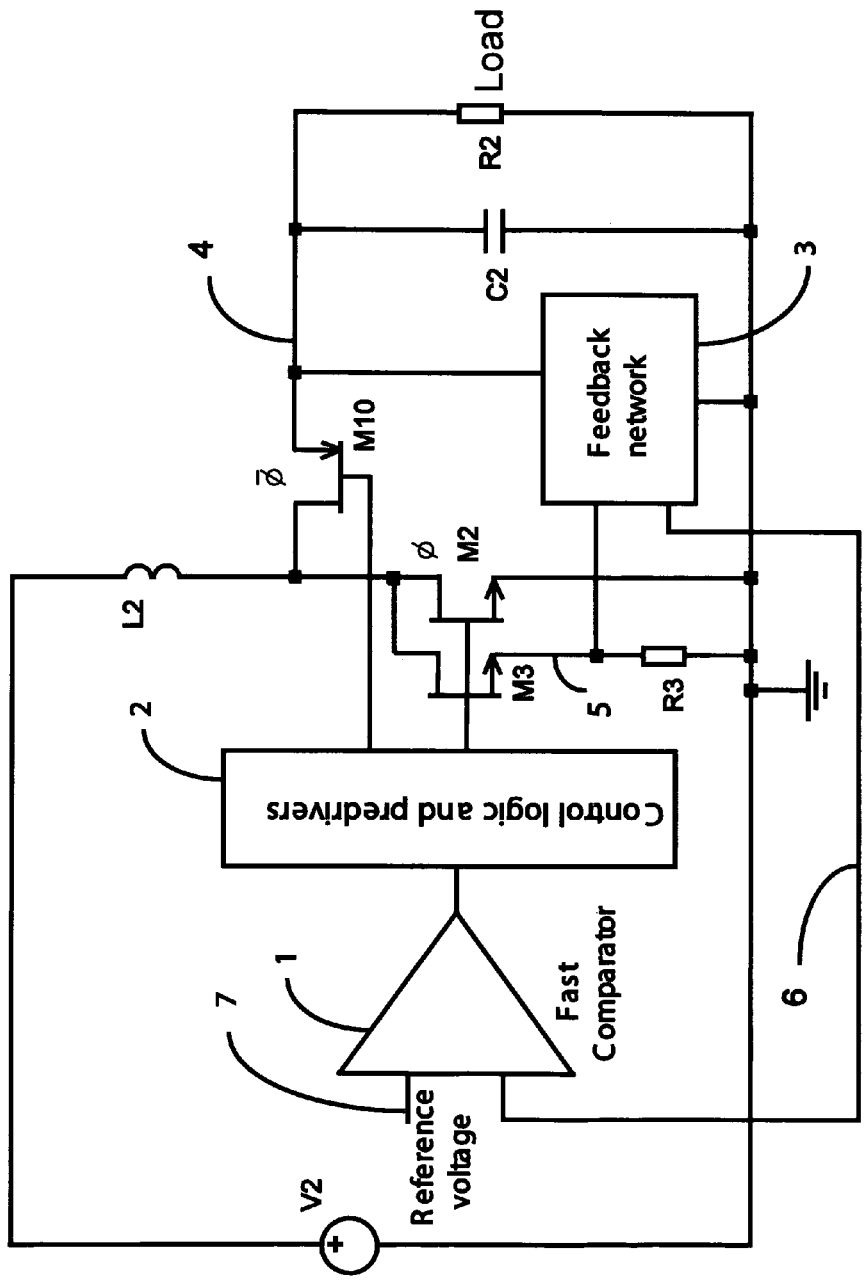
FIG. 2C shows a schematic of the synthetic ripple hysteretic boost power converter according to a further preferred embodiment of the present invention where the diode of FIG. 2A is replaced by a MOS transistor.

FIG. 2 is showing the schematic of the synthetic ripple hysteretic boost power converter according to the preferred embodiment of the present invention. FIG. 2 describes a novel approach in which a signal proportional and in phase to the inductor current is fed to a feedback network that generates a synthetic ripple signal to be successively compared to a reference signal to determine the duty cycle and drive signal for the power devices of the boost power converter.

FIG. 2 describes a transistor M3 in parallel to the main power switch M2, with a resistor R3 in series to its source. The relative size of M3 is only a fraction of the size of the power switch M2. The gate of M3 is in common with M2 so that the two devices are turned on and off in synchronism. M3 operates as a switch in the triode region that reports to its source the voltage appearing to its drain. That voltage across the resistor R3 generates a signal that is proportional to the current in the inductor L2.

The signal across the resistor R3 depends on the on resistance of M2, while during the recirculation phase (when M2 is off) it gets discharged with a time constant that is proportional to the value of R2 and the total capacitance present in the feedback network 3 as seen at the node 5. This signal is therefore in phase with the inductor current. This signal is added, in the feedback network 3, to a signal proportional to the voltage at the output node 4. The resulting signal 6 is fed to the fast comparator 1 which compares it with a reference signal 7 for proper output voltage regulation. The output of the comparator feeds a control logic and pre-driver block 2 to determine the adequate duty cycle and provide the drive signal to M2.

Since the signal across the resistor R3 is proportional to the inductor current, it can be utilized to implement an overcurrent protection simply by means of comparing the voltage across R3 with a reference voltage that relates to the maximum inductor current allowable. Furthermore since, as mentioned above, during the recirculation phase the voltage across R3 discharges with a time constant dependent on the resistor value and the total capacitance seen at the input 5 of the feedback network 3, the value of the resistor R3 affects directly the converter switching frequency.

This correlation between the value of R3 and the switching frequency can be utilized to form a frequency control circuit where the resistor R3 is replaced by a MOS transistor whose on-resistance is modulated to maintain the switching frequency of the converter constant independently from the conditions of the power converter (input voltage, output load). However the value of the resistor R3 is also related to the overall gain of the control circuit of the boost converter, therefore particular attention has to be paid to the interaction of the two control loops.

The diode D2 of FIG. 2 could be also replaced by a second power MOS switch in order to achieve higher efficiency, as the same general considerations made so far remain valid. The proposed circuit topology is amenable to operate at high switching frequency because the loop does not include complex stability networks that introduce poles in the frequency domain and therefore delays in the operation of the circuit. The two most important blocks in the loop are the fast comparator and the feedback network. The switching frequencies for the proposed topology can be in the order of many tens of MHz allowing much smaller inductor and capacitors values.

In the case of very high switching frequencies it may be advantageous to use a Schottky diode or more generally a diode, as in FIG. 2, rather than a MOS power device to optimize conversion efficiency. However, the best implementation largely depends on the operating currents and on the process technology available for the application.

When the load current is low enough, and dependently on the output and input voltage ratio, the inductor current may instantaneously reach the zero value. If the control loop operates in CCM the inductor current becomes negative impacting adversely the converter's efficiency. However if a diode is used, as shown in FIG. 2, the current in the inductor cannot be reversed and the power converter automatically operates in DCM when the load currents are low enough. If a switch is used in place of D2, then it is advantageous to monitor the inductor current by means of sensing the voltage drop across the switch itself, turning off the switch when the inductor current reaches zero and resuming the switching when the ramp signal at the output of the feedback network toggles the fast comparator.

The inductor charging phase can then be kept active for a predetermined amount of time seeking the optimum trade-off between the switching frequency and the output voltage ripple with the purpose of maximizing the overall converter efficiency. This mode is the DCM mode of operation and it is characterized by a lower switching frequency. The lower the switching frequency, the higher the output voltage ripple for a given inductor and output capacitor value. At light loads it may be desirable to allow higher output voltage ripple in order to obtain higher efficiency.

The DCM mode can also be properly adjusted by adequate choice of values for the components in the feedback network, since automatically, lighter loads command longer time for the output voltage to drop and for the synthetic ripple signal to toggle. Another important consideration is that the adoption of a power switch in place of the diode D2, although more cumbersome to drive at high switching frequencies, may provide the control of the initial surge current at start up which is very important for battery supplied power converters. This feature cannot be obtained by using the diode D2 as shown in FIG. 2.

Furthermore the initial phase of operation of the boost converter (when the output voltage is low and far from the regulation voltage) has to be set by means of open loop forced switching (for example by means of controlling the maximum on time of the switch or by means of maximum inductor current peak control) or by the implementation of a separate loop distinct from the proposed hysteretic loop. This is desirable until the output voltage has reached the regulation value, after which the hysteretic control loop can be phased in. This different mode of operation, when the output voltage is not close to the desired final value, is inherent in the nature of the hysteretic control loop for a boost converter. Possibly this could be implemented by using a more complex multi-mode feedback network that allows soft start and adaptive operation. However this is beyond the scope of the present invention.

It should also be noted that the input voltage V2 of FIG. 2 could be different from the power supply of the internal blocks of the integrated converter. In fact, the internal circuitry may be operated at lower supply voltages and implemented in a smaller lithography process technology and switched at high frequency with high efficiency.

In FIG. 2 the transistor M3 is operated with the same gate voltage of the power switch M2, but in some implementations it may be more advantageous to turn on M3 with a little delay with respect to the turning on of M2. Similarly it may be convenient to turn off M3 a short time in advance with respect to the turning off of the transistor M2. This slight timing mismatch between the two devices could prevent possible glitches in the sense inductor current, resulting as spikes in the voltage across the resistor R3.

B FIG. 3

Figure 3:
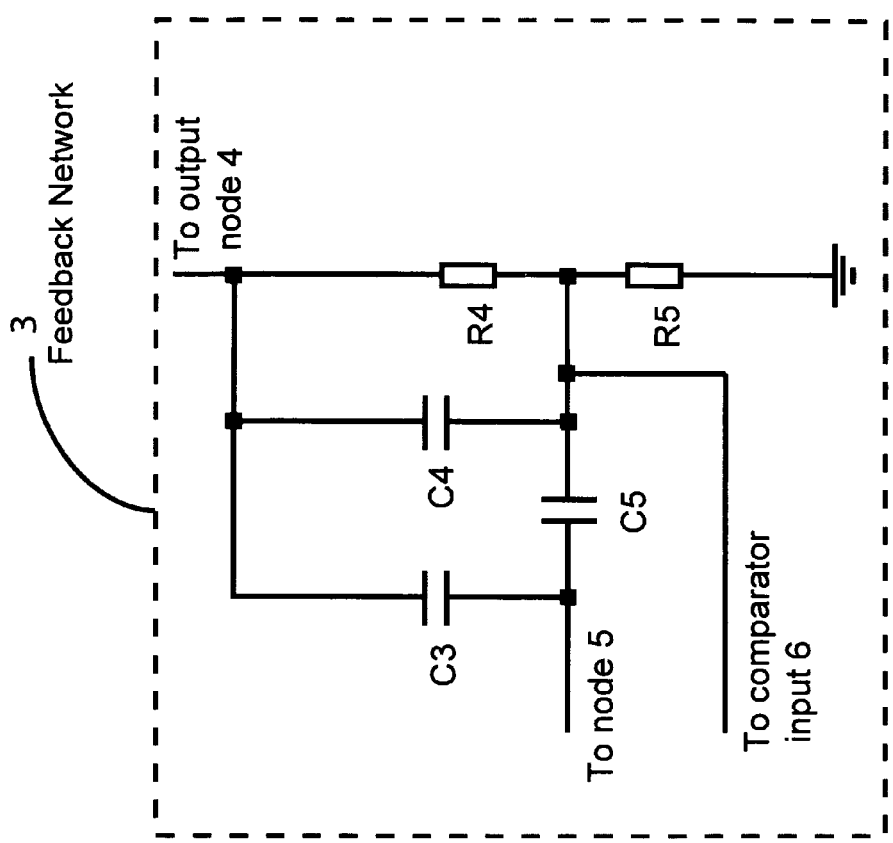
FIG. 3 shows a schematic of the feedback network of the proposed hysteretic boost converter according to a first embodiment of the present invention.

The feedback network block 3 of FIG. 2 can be implemented in various ways, with passive components or with a combination of passive and active components. One of its embodiments is shown in FIG. 3. In this implementation the feedback network comprises exclusively passive components. The resistor R4 and R5 form a resistor divider to scale the output voltage down to the desired value. The capacitor C3, generally of larger value with respect to C4 and C5, provides a signal proportional to the current in the output capacitor C2 of FIG. 2. This is particularly important in the presence of fast load transients.

In presence of a fast load transient, the abrupt change of current in the load causes an equivalent and opposite change of current in the output capacitor C2 of FIG. 2. If a second capacitor were added in parallel to the capacitor C2, the change of current would be split according to the values of the two capacitors. If the capacitor C3 of FIG. 3 is large enough with respect to the size of C2, and if the resistor R3 of FIG. 2 is not too large, a portion of the current flowing in C2 tends to flow in C3. This forms a fast signal at the level of the feedback network that takes into account the change due to the load transient.

The capacitor C5 AC-couples the signal from the node 5 proportional to the inductor current to the signal of the resistor divider R4/R5 which is proportional to the output voltage effectively summing the two signals. Finally the capacitor C4 is a feed-forward capacitance to provide high phase margin and stability in all operating conditions. The signal at the node 6 represents the synthetic ripple signal that is used by the comparator to generate the hysteretic control. This signal also governs the power stage switching frequency and contributes to a fast load and line transient response.

The topology and values of the components in the feedback network define the self oscillating switching frequency, the stability, and the load and line transient response performance of the whole converter. The switching frequency has a direct impact on the output voltage ripple and on the converter efficiency. The switching frequency can be regulated and imposed by a separate frequency control loop that can be implemented in various ways. When the switching frequency is regulated, for example by means of a PLL (Phase Lock Loop), the study of the loop becomes more complex and an accurate analysis can be performed by periodic state analysis to guarantee the circuit stability in all conditions.

The feedback network 3 is typically composed of passive components but, more in general, it could include active components and have different functionalities depending on the load and line conditions and on whether the converter is in CCM or DCM mode of operation. Furthermore the feedback network, differently from the embodiment of FIG. 3, may not include a resistor divider to scale down the output voltage to a desired voltage since that may be external to the feedback network block.

The presented topology, similarly to conventional boost power converters, modulate the duty cycle for output voltage regulation according to the transfer function Vout/Vin=1/(1−D) where D is the duty cycle. It is known that boost converter's control loops, especially when the duty cycle is greater than 50%, are subject to sub-harmonic oscillations. The values of the capacitor C3 and especially C4 are paramount to maintain stability in various conditions and to prevent sub-harmonic oscillations.

C FIG. 4

Figure 4:
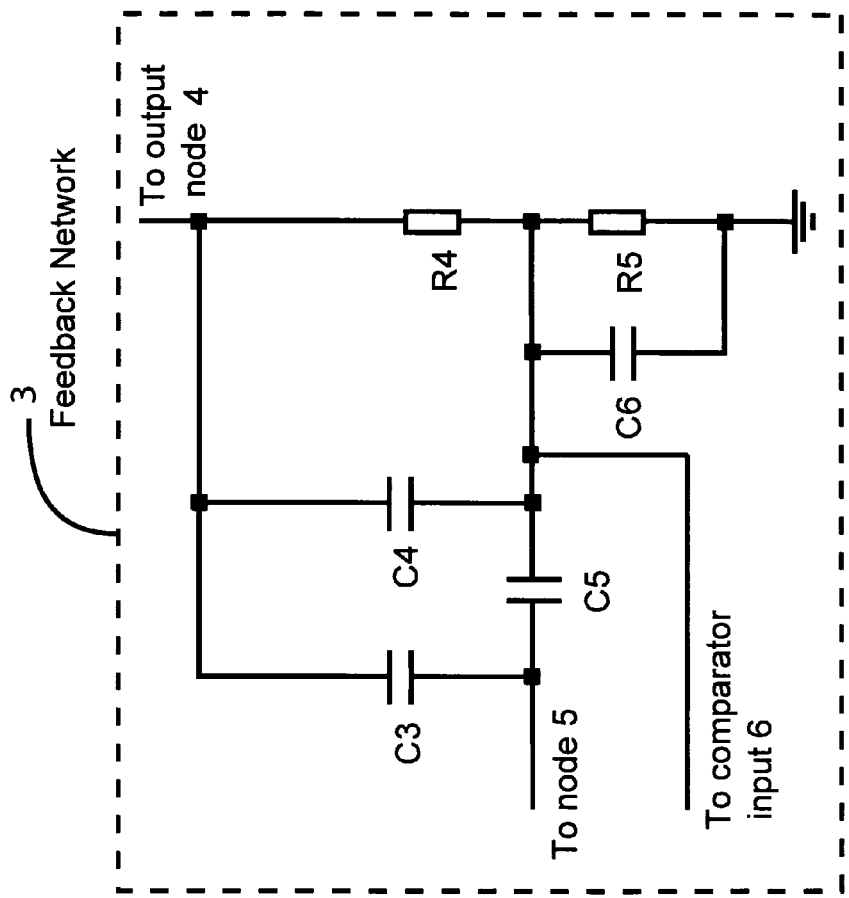
FIG. 4 shows a schematic of the feedback network of the proposed hysteretic boost converter according to a second embodiment of the present invention.

FIG. 4 shows a second embodiment for the feedback network 3 of FIG. 2. The circuit of FIG. 4 is very similar to the one of FIG. 3 with the only difference being the addition of the capacitor C6 coupled to the resistor divider and to ground. This extra capacitor introduces a further degree of freedom to obtain the optimum switching frequency (output voltage ripple) and line and load transient response of the power converter, maintaining a very fast control loop amenable to high switching frequencies.

D FIG. 5

Figure 5:
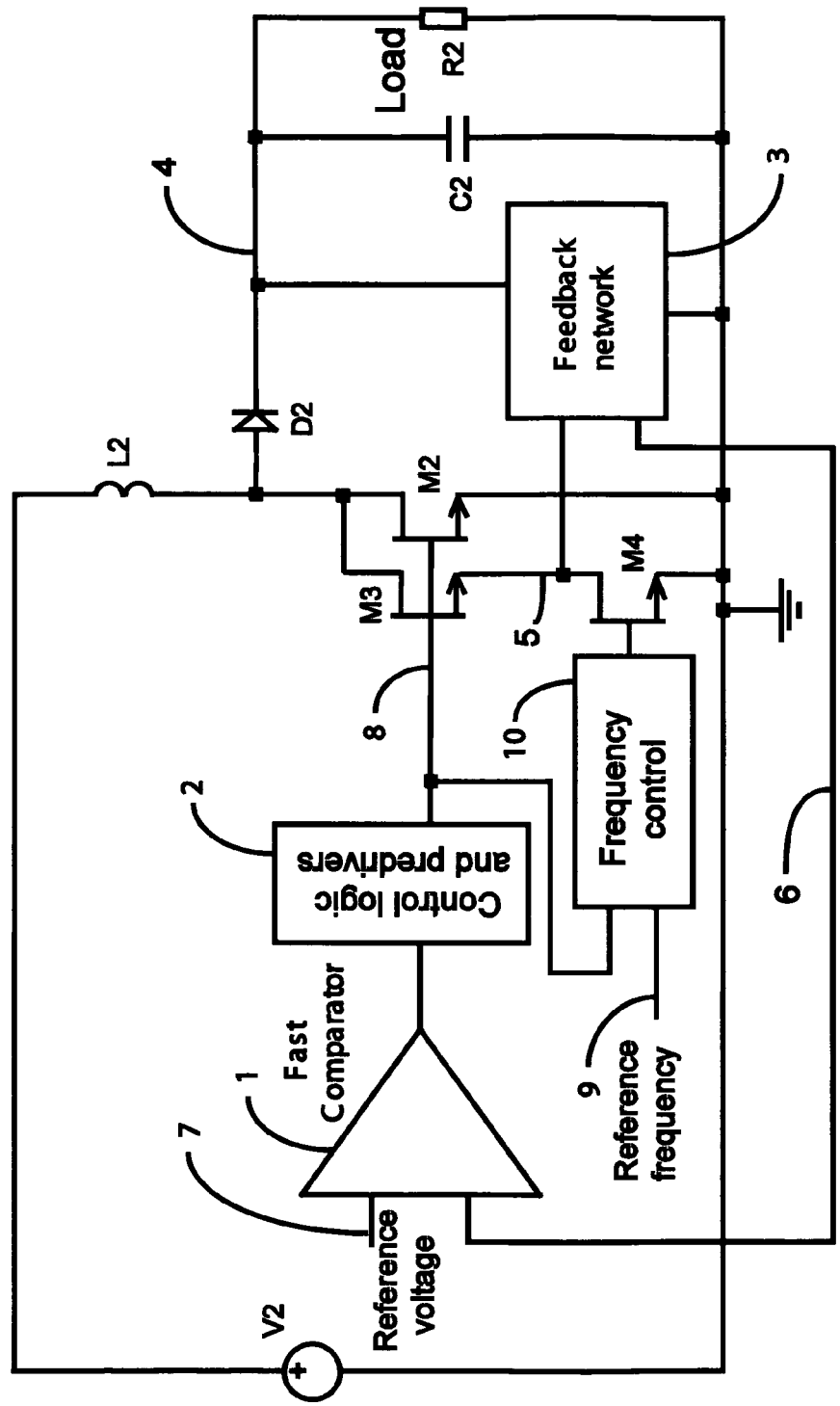
FIG. 5 shows a schematic of the synthetic ripple hysteretic boost power converter according to a second embodiment of the present invention that includes a frequency control circuit.

FIG. 5 shows the schematic of the hysteretic boost power converter according to another embodiment of the present invention where a frequency control loop is included. This schematic is very similar to the one described in FIG. 2 with the exception of the resistor R3. As explained above, the value of the resistance R3 of FIG. 2 has a direct impact on the switching frequency. In this case, the resistor R3 is replaced by an NMOS transistor M4 driven by a frequency control circuit 10. The transistor M4 is driven by a signal originated in the block 10 which can be implemented with a PLL (Phase Lock Loop) or in various different ways known to anyone skilled in the art.

The block 10 implements a feedback circuit that modulates the voltage of the gate of the transistor M4 in order to regulate the converter switching frequency to be the same as the reference frequency signal at node 9 by varying the on resistance of M4. The block 10 has a second input 8 from which it extracts the instantaneous switching frequency that it controls.

E FIG. 6

Figure 6:
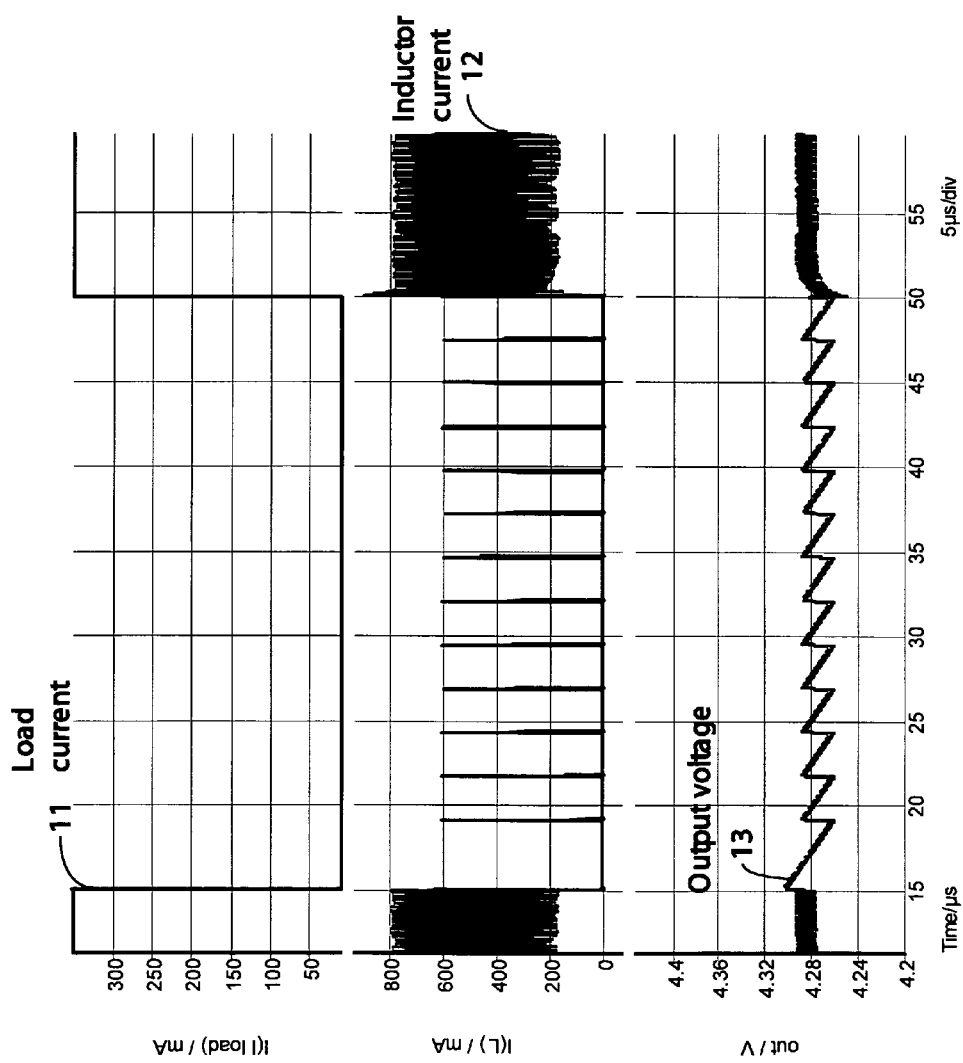
FIG. 6 shows the main voltage and current waveforms as result of the simulation of the circuit of FIG. 2 and FIG. 3 during a fast load transient.

FIG. 6 shows the main voltage and current waveforms as result of the simulation of the circuit illustrated in FIG. 2 in presence of a fast load transient. In particular the value of the output capacitor C2 was 1 uF, the inductor L2 value was 200 nH and the value of the resistor R3 was 300Ω. The input voltage was 3.6V. The load current was switched in 1ns from 350 mA to 10 mA and back to 350 mA as reported in the upper waveform 11.

The waveforms 12 and 13, respectively the inductor current and the output voltage waveforms, clearly show the change of mode of operation when the load transient occurs. When the load current is 350 mA the converter operates in CCM and the current ripple toggles approximately from 200 mA to 800 mA. The switching frequency in CCM is about 15 MHz. When the load drops to 10 mA the converter switches to DCM and the inductor current has peaks of almost 600 mA at much lower frequency (about 400 KHz). When the current reaches the zero value it is kept at such for some time until the output voltage falls below a predetermined threshold as detected by the feedback network.

In this specific case the output voltage ripple in DCM, although higher in amplitude, is not very different from the one in CCM. The lowering of the switching frequency in DCM allows lower switching losses and high conversion efficiency with light loads.

F FIG. 7

Figure 7:
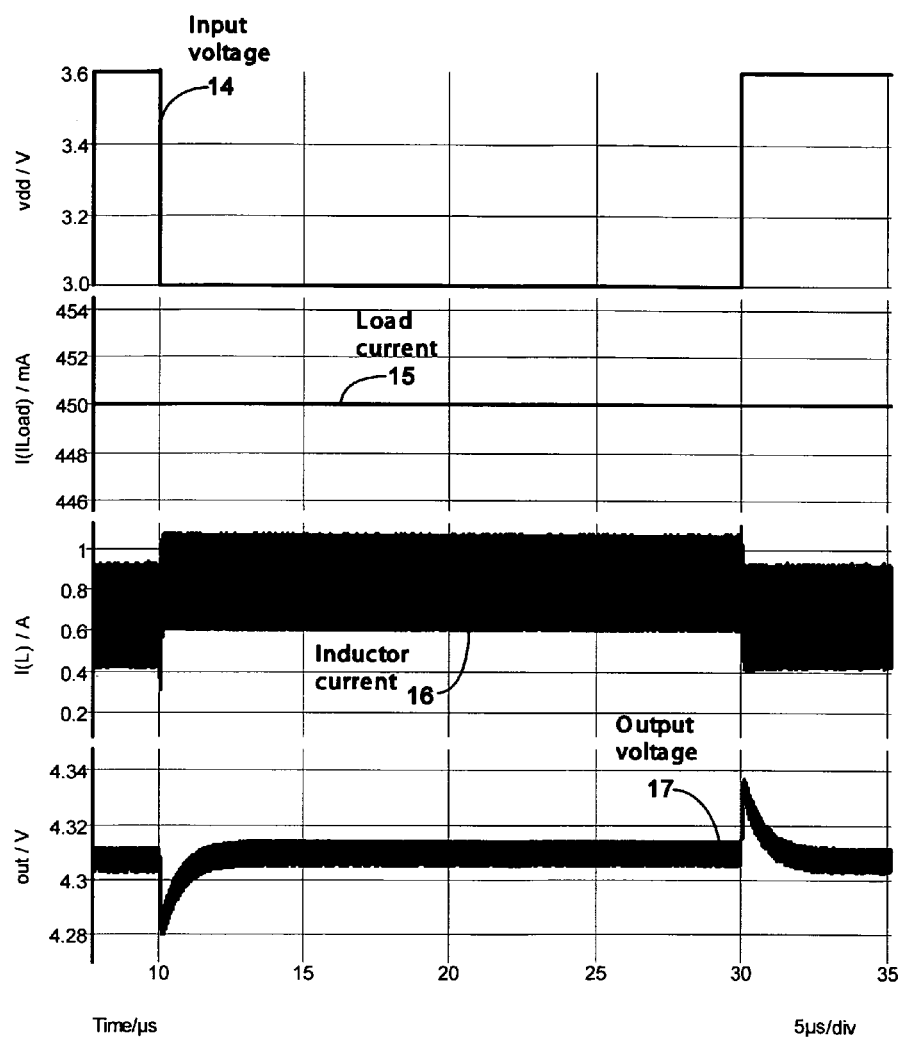
FIG. 7 shows the main voltage and current waveforms as result of the simulation of the circuit of FIG. 2 and FIG. 3 during a fast line transient.

FIG. 7 shows the main voltage and current waveforms for the simulation of the circuit of FIG. 2 in presence of a fast line transient. In particular the value of the output capacitor C2 was 200 nF, the inductor L2 value was 20 nH and the resistor R3 value was 200Ω. The load current was 450 mA. The input voltage was switched in 1 ns from 3.6 V to 3V and back to 3.6V as reported in the upper waveform 14.

The waveforms 16 and 17, corresponding to the inductor current and the output voltage waveforms respectively, clearly show the converter response to the fast line transient. In both cases the converter operates in CCM but with different duty cycle. When the supply voltage is 3.6V the converter operates in CCM and the current ripple toggles approximately from 400 mA to 900 mA. The switching frequency is 140 MHz. When the input voltage gets much lower the converter swiftly changes its duty cycle and the inductor current has peaks in excess of 1 A and the switching frequency is slightly lower (125 MHz) maintaining the output voltage ripple at about 13 mV (with only 200 nF of output capacitor).

In this specific case the switching frequency was different because this scheme did not include the frequency control loop circuit.

G FIG. 8

Figure 8:
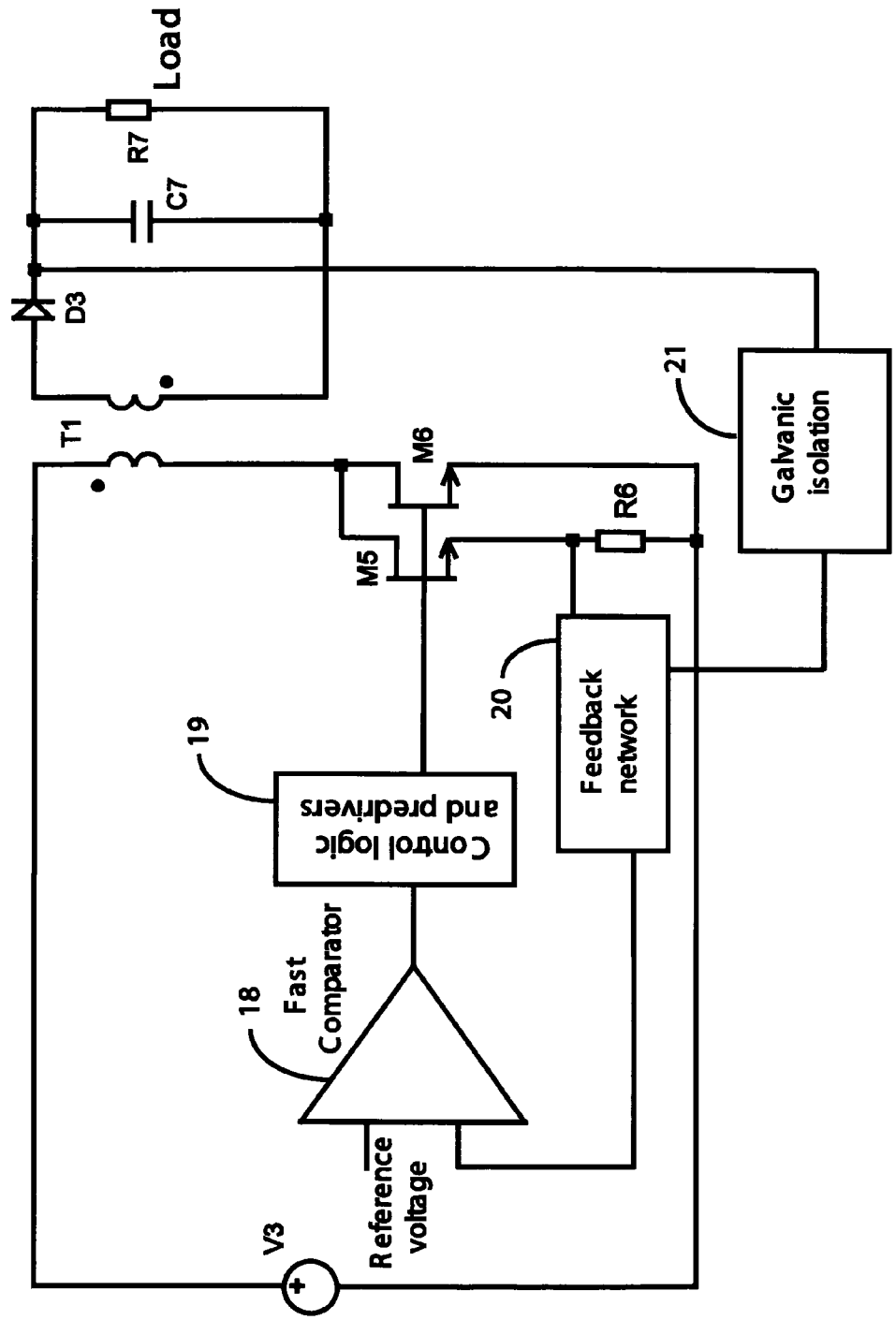
FIG. 8 shows a schematic of the synthetic ripple hysteretic isolated flyback power converter according to a further embodiment of the present invention.

FIG. 8 shows a schematic of the synthetic ripple hysteretic isolated flyback power converter according to an embodiment of the present invention. The flyback isolated switching power converter topology has an inherent similarity with the boost converters described above, in fact, when the switch M6 is turned on, the transformer primary winding gets charged but no energy gets transferred to the load during this phase. Only when the MOS transistor M6 is turned off the energy gets transferred to the load at the secondary side of the transformer.

Therefore a hysteretic control, as described for the more general boost converter topology, is amenable to this types of isolated converters conveying the advantages of being able to utilize higher switching frequency. The output voltage signal is transferred to the primary by means of a block 21 indicated in FIG. 8 with the label "galvanic isolation" that could be implemented with a pulse transformer or an opto-coupler. This signal is then fed to the feedback network at the primary side and added to the signal from the source of the transistor M5 in phase with the inductor current. Most of the considerations made for the boost configurations apply to this topology as well.

The flyback converters are often utilized, in very high volumes, in AC-DC power conversion applications and the ability to operate at high switching frequency allows a significant reduction in size and cost of switching wall adapters (even if the high voltage power devices are often the main obstacle to high switching frequencies). However, the introduction of high frequency flyback converters could introduce new applications also for non-isolated flyback topologies in particular for low voltage power conversion applications. In that case there would be no need for a galvanic isolation and the transformer could provide a wider transfer ratio within a reasonable range of duty cycle.

H FIG. 9

Figure 9:
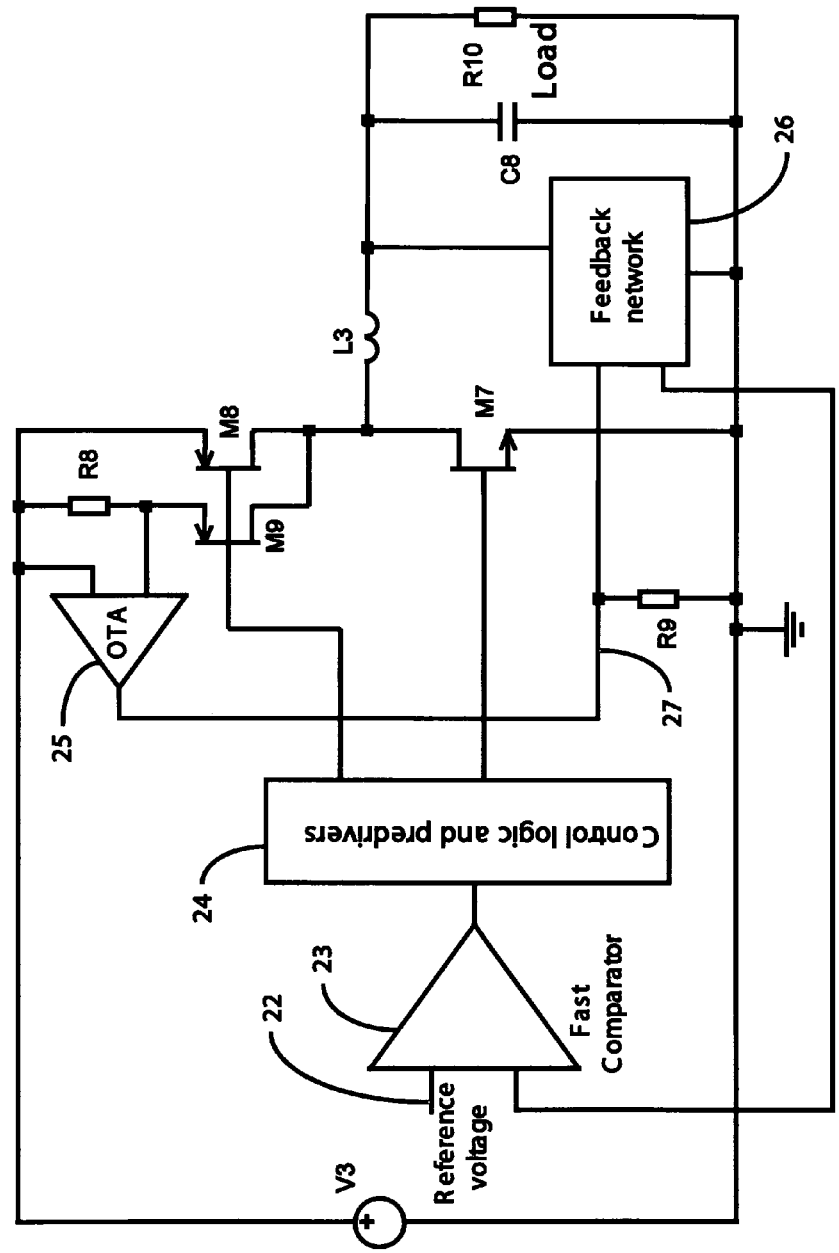
FIG. 9 shows a schematic of the synthetic ripple hysteretic buck power converter according to a further embodiment of the present invention.

FIG. 9 shows a schematic of the synthetic ripple hysteretic buck power converter according to an embodiment of the present invention. The described approach of generating a synthetic ripple signal by effectively summing a signal proportional and in phase with the inductor current during the charge phase with a signal proportional to the regulated output voltage can also be applied to a buck switching converter. In a step down non isolated switching converter, as shown in FIG. 9, the inductor current during the inductor charge phase is provided by a high side driver power switch; therefore the inductor current can be sensed by sensing the drain voltage of the high side switch M8 when it is on.

This can be accomplished by switching the transistor M9 in phase with the power device M8. FIG. 9 shows the two transistors M8 and M9 driven by the same signal since they have a gate connection in common, but more likely they can be driven with a slight delay between the two in order to prevent possible glitches at the sensed voltage across the resistor R8. This signal is naturally referred to the buck supply voltage V3 positive terminal (input voltage), therefore an efficient and wide bandwidth transconductance amplifier 25 can be utilized to transfer that signal to a resistor R9 referred to the negative terminal of the input power source.

The output current of the OTA (Operational Transconductance Amplifier) 25 is converted back into a voltage by the resistor R9. This signal 27 is fed to the feedback network 26 in an analogous way described for the boost topology. The same type of feedback network can be utilized for the buck converter, making this solution very attractive for buck-boost converters as well, since the control method and circuit is practically the same. Again this provides very good control of the output voltage independent on the load and line variations. This is also amenable to high switching frequencies and it offers excellent transient load and line response.

Similarly to the case of the boost circuit described above, the signal proportional to the inductor current 27 can also be utilized as current limit sense. Additionally, the same feedback network, if appropriately sized in the values of its components, can be utilized in the case of DCM mode of operation when the load falls below a certain value.

Although the present invention has been described above with particularity, this was merely to teach one of ordinary skill in the art how to make and use the invention. Many additional modifications will fall within the scope of the invention. Thus, the scope of the invention is defined by the claims which immediately follow.

What is claimed is:

1. A switching power converter to efficiently convert power from a power source comprising:
    a first power device coupled between a negative terminal of said power source and a switching node;
    an inductor coupled between a positive terminal of said power source and said switching node;
    a diode coupled between said switching node and an output terminal of said switching power converter;
    a switch MOSFET device comprising a drain terminal coupled to said switching node, a source terminal directly coupled to a resistor and to a feedback network, wherein said switch MOSFET device is switched in phase with said first power device and,
        wherein said resistor is coupled to said negative terminal of said power source;
    a capacitor coupled between said output terminal of said switching power converter and said negative terminal of said power source;
    a load coupled between said output terminal of said switching power converter and said negative terminal of said power source;
        wherein said feedback network generates a synthetic ripple signal;
        wherein said synthetic ripple signal is proportional to the sum of a first signal proportional and in phase to a current flowing in said inductor and of a second signal proportional to an output voltage appearing at said output terminal of said switching power converter;
    a comparator providing hysteretic control of said switching power converter in response to said synthetic ripple signal and to a reference signal, and
    a control logic circuit and a pre-driver circuit for generating signals to drive said first power device in response to an output signal of said comparator, and to operate said switching power converter at a switching frequency.

2. The switching power converter of claim 1, wherein said switch MOSFET device is turned on with a slight delay with respect to said first power device and,
    wherein said first power device is turned off with a slight delay with respect to said switch MOSFET device.

3. The switching power converter of claim 1, wherein said diode is replaced by a second power device to be operated with opposite phase with respect to said first power device in continuous conduction mode.

4. The switching power converter according to claim 1, wherein said diode is replaced by a second power device to be operated with opposite phase with respect to said first power device in continuous conduction mode;
    wherein said current flowing in said inductor is sensed directly or indirectly;
    wherein said first, and second power devices are open when said current flowing in said inductor reaches substantially a zero value;
    wherein switching is resumed when said output voltage of said switching power converter reaches a value outside of a predetermined range, and
        whereby the efficiency of said switching power converter is maintained high by lowering said switching frequency when current in said load reaches substantially low values.

5. The switching power converter of claim 1, wherein said switching frequency is maintained substantially constant in continuous conduction mode by means of a dedicated frequency control circuit.

6. The switching power converter of claim 1, wherein said switching frequency in continuous conduction mode is higher than 10 MHz.

7. The switching power converter of claim 1, wherein said feedback network is comprising components to alter the operation of said switching power converter depending on whether said switching power converter operates in continuous conduction mode or in discontinuous conduction mode.

8. The switching power converter of claim 1, wherein said resistor is replaced by a MOS transistor;
    wherein said MOS transistor is comprising a drain terminal, a source terminal and a gate terminal;
    wherein said drain terminal of said MOS transistor is directly coupled to said source terminal of said switch MOSFET device;
    wherein said source terminal of said MOS transistor is coupled to said negative terminal of said power source and,
        whereby said MOS transistor is driven to alter its drain to source resistance.

9. The switching power converter of claim 1, wherein said resistor is replaced by a MOS transistor;
    wherein said MOS transistor is comprising a drain terminal, a source terminal and a gate terminal;
    wherein said drain terminal of said MOS transistor is directly coupled to said source terminal of said switch MOSFET device;
    wherein said source terminal of said MOS transistor is coupled to said negative terminal of said power source, and
    wherein said gate terminal of said MOS transistor is driven in response to a signal generated by a frequency control circuit.

10. A method to efficiently convert power from a power source comprising:
    switching a power device at a switching frequency;
    charging and discharging with a modulated duty cycle an inductor;
    generating a first signal proportional and in phase to said inductor current during the charging phase of said inductor and decaying with a time constant dependent on a feedback network during the recirculation phase of said inductor;
    wherein an output capacitor is coupled between an output terminal and a negative terminal of said power source;
    wherein said power device is coupled between a switching node and said negative terminal of said power source;
    wherein said inductor is coupled between said switching node and a positive terminal of said power source, and wherein a second power device is coupled between said switching node and said output terminal;

generating a second signal proportional to an output voltage appearing at said output terminal;

generating a synthetic ripple signal summing said first signal and said second signal;

comparing said synthetic ripple signal to a reference signal by means of an hysteretic comparator;

modulating the duty cycle of said power device in response to an output of said comparator, whereby the voltage appearing at said output terminal is regulated to be at a desired value substantially independent from a load coupled between said output terminal and said negative terminal of said power source, and whereby the modulation of the duty cycle occurs by means of an hysteretic control.

11. The method of claim 10, wherein said switching frequency is maintained substantially constant in continuous conduction mode by means of a dedicated frequency control circuit.

12. The method of claim 10, wherein said switching frequency in continuous conduction mode is higher than 10 MHz.

13. The method of claim 10, wherein said switching frequency is maintained substantially constant in continuous conduction mode by means of a transistor that modulates said time constant, wherein said transistor is comprising a gate terminal, and wherein said gate terminal of said transistor is driven in response to a signal generated by a frequency control circuit.

14. A method to efficiently convert power from a power source comprising:

switching at least one power device coupled between a switching node and a negative terminal of said power source;

charging and discharging with a modulated duty cycle at least one primary winding of a transformer with at least one terminal coupled to said switching node;

extracting a signal proportional and in phase to current in said primary winding of said transformer during the charging phase of said primary winding of said transformer;

generating a synthetic ripple signal by combining said signal proportional and in phase to current in said primary winding of said transformer with a second signal proportional to an output voltage appearing at an output terminal of a secondary side of said transformer;

comparing said synthetic ripple signal to a reference signal by means of an hysteretic comparator;

modulating the duty cycle of said power device in response to an output of said comparator, whereby said output voltage appearing at said output terminal of said secondary side of said transformer is regulated to be at a desired value substantially independent from a load coupled between said output terminal and a second negative terminal, and, whereby the modulation of the duty cycle occurs by means of an hysteretic control.

15. The method of claim 14, wherein power from said power source is converted by means of a flyback isolated switching power converter circuit topology.

* * * * *